219-121
12/28/76    OR    4,000,392

United States Patent [19]
Banas et al.

[11] 4,000,392
[45] Dec. 28, 1976

[54] FUSION ZONE PURIFICATION BY CONTROLLED LASER WELDING

[75] Inventors: Conrad M. Banas, Manchester; Edward M. Breinan, Glastonbury, both of Conn.

[73] Assignee: United Technologies Corporation, Hartford, Conn.

[22] Filed: Dec. 9, 1975

[21] Appl. No.: 639,145

Related U.S. Application Data

[63] Continuation of Ser. No. 485,189, July 1, 1974, abandoned.

[52] U.S. Cl. .......................................... 219/121 LM
[51] Int. Cl.² .......................................... B23K 27/00
[58] Field of Search ... 219/121 LM, 121 L, 121 EB, 219/121 EM, 137 R; 331/DIG. 1

[56] References Cited

UNITED STATES PATENTS

| | | | |
|---|---|---|---|
| 3,535,489 | 10/1970 | Hinrichs | 219/121 EB |
| 3,824,368 | 7/1974 | Locke | 219/121 LM |
| 3,860,784 | 1/1975 | Brown et al. | 219/121 LM |

OTHER PUBLICATIONS

"Welding for Engineers" by Udin et al., John Wiley & Sons, Inc. New York pp. 10-13.
"Understanding the Role of Inclusions and Microstructure in Ductile Fracture" by Hill et al., Welding Research Supp. pp. 481s-485s, 11-1974.
"Welding With a High-Power CO₂ Laser" by Ball et al. Society of Automotive Engineers, Paper 740863, Oct. 1974.
"Welding Metallurgy Carbon and Alloy Steels" by Linnert, American Welding Society, p. 59 & pp. 224-225 & pp. 250-255, 3rd Ed. vol. 2.
"The New Development of Steel Weldments" by Gross, Welding Research Supp., June 1968, pp. 241s-245s.

*Primary Examiner*—Bruce A. Reynolds
*Assistant Examiner*—G. R. Peterson
*Attorney, Agent, or Firm*—Anthony J. Criso

[57] ABSTRACT

A method of accomplishing a controlled weld with a beam of laser radiation is disclosed. The workpiece is cleaned and fitted prior to joining and a flow of a gas is provided in the weld region to prevent the formation of radiation insulating plasma between the laser source and the workpiece and to aspirate gaseous impurities from the weld zone. In addition, a trailing cover gas is provided to both the top and the bottom of the weld until the joint is sufficiently cooled to prevent reaction between the metal and the atmosphere. The beam must contain more than two kilowatts of power and be focusable on the workpiece to a power density of at least one megawatt per square inch in order to produce a keyhole in the fusion zone. Further, a weld speed in excess of twenty inches per minute and a progressive solidification technique of the weld contribute to the expulsion of contaminants from the weld.

8 Claims, 10 Drawing Figures

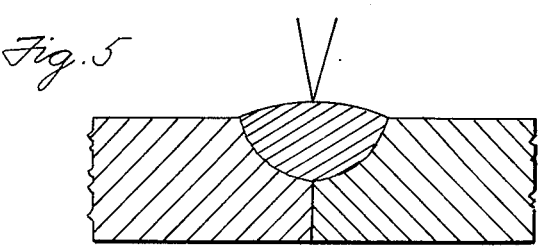
Fig. 5  LOW POWER WELD ZONE
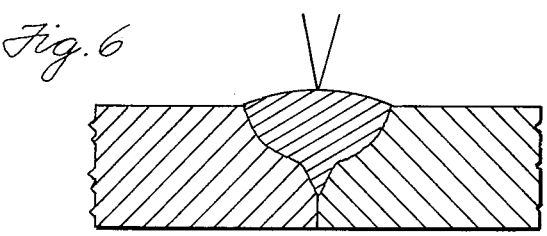
Fig. 6  TRANSITION POWER WELD ZONE
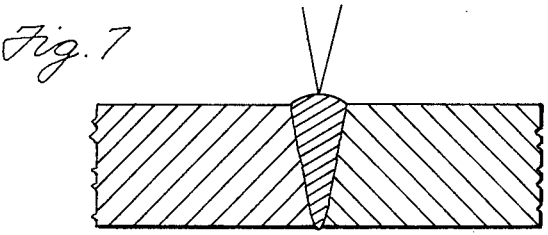
Fig. 7  HIGH POWER WELD ZONE
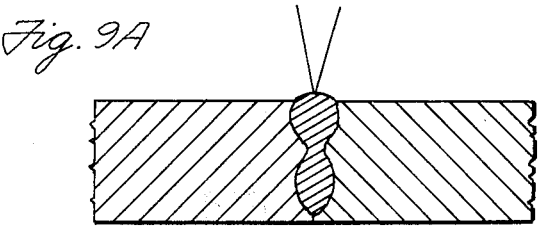
Fig. 9A
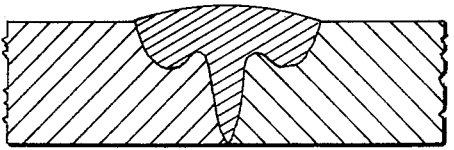
Fig. 9B

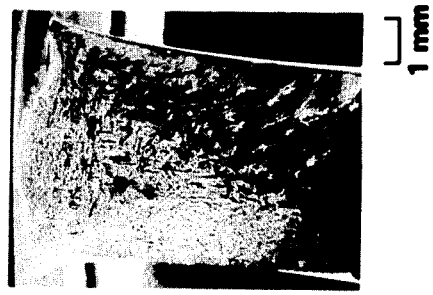
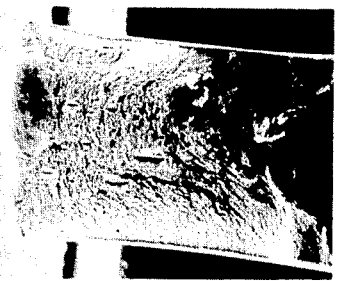
FIG. 8 HY-130 LASER WELD IMPACT STUDY
5 KW - 45 IPM
75°F - 1/2 SIZE CHARPY SPECIMENS
BASE METAL
27 ft-lb
WELD
39 ft-lb
LIGHT MACROGRAPHS
SCANNING ELECTRON MICROGRAPHS

FUSION ZONE PURIFICATION BY CONTROLLED LASER WELDING

This is a continuation, of application Ser. No. 485,189, filed July 1, 1974 now abandoned.

BACKGROUND OF THE INVENTION

1. Field of Invention

The present invention relates to welding and more particularly to laser welding.

2. Description of the Prior Art

Metal welding techniques have been investigated and practiced over a considerable period of time, and various refinements have been developed during this period. In a conventional arc welding process which is typical of the metal welding processes in use, various impurities tend to contaminate the weld zone during the welding process and degrade the quality of the weld. A principal source of these inpurities is the absorbed gas which is found on the surface of the base metal being joined, and on the filter metal used in the joining process. Another source of impurity is the solid matter often present on the surface of the base metal. In addition to the sources associated with the metal to be joined, various impurities including gases and dust are present in the atmosphere surrounding the weld region and find their way into the weld zone. A further source of weld contamination is the impurities present in the metal itself; typically these impurities consist of oxide and sulphide inclusions which occur in the metal during initial manufacture. A still further source of contamination is the impurities which are often found in the shield gas, although additives are sometimes purposely added to the shield gas in order to stabilize the arc.

Each of these sources of contaminants has a tendency to appear in the weld region of the workpiece in an arc welding process due to the dynamics involved. In a typical arc welding process, the arc assumes a dome profile over the work zone, providing a substantially complete cover over the molten pool which is formed during the welding process, with a portion of the pool extending from the trailing edge of the dome. A basic premise which is generally recognized is that fluids tend to move from high energy regions such as the arc formed in a welding process to regions of lower energy. In the interaction zone formed between the arc and the workpiece during the welding process, the arc is the higher energy region and therefore fluids tend to move from the arc toward the workpiece. When shielding gases are used in such a process, they are generally directed along the axis of the filler rod which causes them to be directed essentially toward the workpiece. In addition, the gases in the arc are accelerated toward the workpiece because of the general tendency to move from the higher energy region toward a region of lower energy. These two factors combine to give the gas a momentum which tends to cause the weld pool, which is predominately within the arc zone, to pick up some of the contaminants that have been vaporized and driven toward the workpiece. In addition, contaminants within the material are driven back into the weld zone by both the energy gradient and momentum flux.

Various expedients have been used to minimize contamination in the fusion zone during these welding processes. For example, some of the move obvious steps include mechanical cleaning of the metals to be joined by such techniques as scrubbing, grit blasting or chemical cleaning. In addition, the workpiece to be joined is preheated in order to drive off any adsorbed gases and moisture which may be present. Similarly, through selective care and handling of the filler metal rods, the impurities which could otherwise enter into the weld zone from this source are minimized. During the development of arc welding techniques, various gas shielding devices and techniques have evolved and they contribute significantly to the reduction of impurities in the weld zone. Additionally, the cover gas of flux as the case may be, can be maintained relatively contamination free subject to arc stability requirements. Another technique for minimizing the impurity content in the final weld is to use a filler rod having a suitable offsetting composition which complements the composition of the base metal in a manner which results in a final weld material composition that is within some preselected range.

SUMMARY OF THE INVENTION

A primary object of the present invention is to accomplish metal joining by a laser process which results in the fusion zone having a lower concentration of undesired impurities than the parent metal.

According to the present invention, a laser beam in a single fundamental mode of at least approximately 2 kilowatts of power is focused to a condition of small diameter, large depth of field and a power density of at least one but less than one hundred megawatts per square inch, and advanced along a workpiece at a surface speed in excess of about 20 inches per minute to cause a weld with a gas being provided in the vicinity of the weld to enhance the removal of gaseous impurities from the weld and to avoid interruption of the passage of the laser energy to the weld due to breakdown of the gases in the region above the weld, and an inert gas being applied to the weld joint to avoid reaction between the metal and the atmosphere.

A primary advantage of the present invention is the enhanced mechanical properties of the material in the laser fusion weld zone which are often superior to those of the unwelded base material; specifically, the tensile strength of the metal in the weld surpasses the tensile strength of the base metal. Further, in contrast to the results usually obtained by conventional welding, the enhanced tensile strength is accompanied by a corresponding increase in weld zone toughness and since the weld joint efficiency can be greater than one hundred percent, the base material can be utilized to its full structural capability. In addition, the high toughness of the weld metal causes the weld to function as a crack arrester in some structures, rather than being a source of most rapid failure, as is often the case with conventionally fabricated welds. In practical terms, a reduction in the size of a section is possible as a result of the strong, tough, welded joints which occur in the practice of this invention; alternatively, any section not reduced in size is capable of bearing greater loads than would otherwise be possible. Another advantage is the lowering of the cost of a product in those applications amenable to the substitution of a poorer grade of base metal as a consequence of the enhanced weld strength.

A primary feature of controlled laser welding according to the present invention is the purification of the metal in the fusion zone; no filler material is used. Another feature is the use of select cover gases to minimize deflection or distortion of the laser beam, to avoid plasma breakdown in the weld region, and to prevent atmospheric contamination of the fusion zone. In addition, thermal distortion of the workpiece is reduced as a direct result of the relatively small amount of laser energy consumed in forming the fusion zone. Further, the invention is characterized by a welding speed which is nominally an order of magnitude faster than the welding speeds achieved with arc welding techniques.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 5 is a cross section through the weld zone produced with a laser beam of low power;

FIG. 6 is a cross section through the weld zone produced with a laser beam of a transitional power range;

FIG. 7 is a cross section through the weld zone which results from a laser weld beam of high power and power density;

FIG. 8 is a micrograph comparing base metal and weld metal after a Charpy impact test in an HY-130 specimen;

FIG. 9A is a sketch of an hourglass weld zone typically produced with an improperly focused laser welding beam; and FIG. 9B is a sketch of a weld zone typically produced with a laser beam having higher order or multiple mode pattern.

DESCRIPTION OF THE PREFERRED EMBODIMENT

Figure 1:
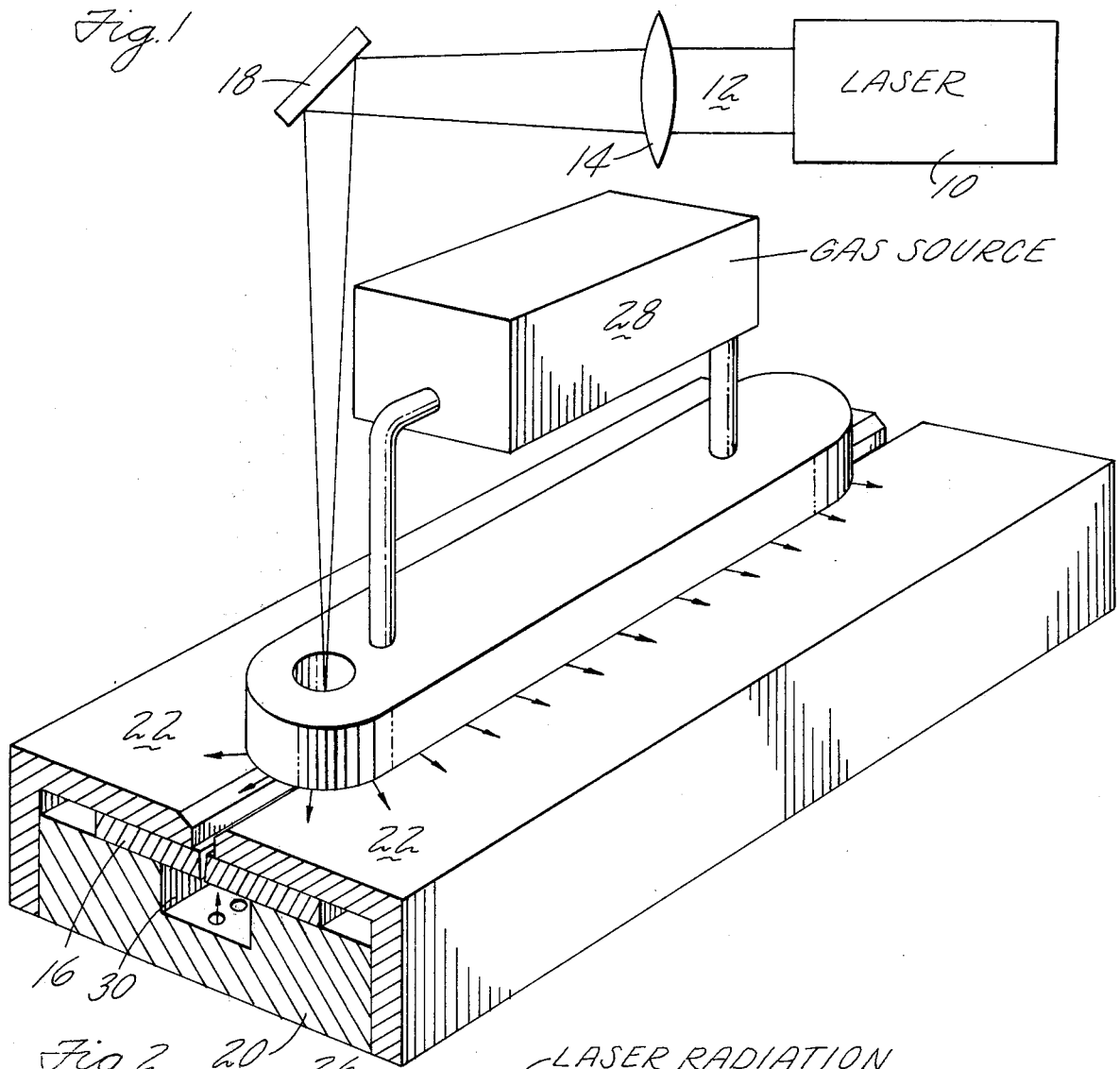
FIG. 1 is a simplified perspective of a laser welding apparatus in accordance with the present invention.

In all the known welding techniques, impurities characteristically tend to occur in the region of the fusion zone while the metal is in a molten state, resulting in contamination of the weld which is thereby weakened. A weld is considered good if the mechanical properties of the weld approach those properties of the base material although conventionally fabricated welds generally have some lower mechanical properties than the surrounding base metal. According to the controlled laser welding of the present invention, a process is disclosed in which the fusion zone is actually purified and the resulting mechanical properties of the weld material in the fusion zone equal or surpass the mechanical properties of the parent material. A typical arrangement of the apparatus employed in the practice of this invention is shown in FIG. 1. A radiation source 10 of laser energy provides an output beam 12 which is made convergent by focusing optics 14 and is directed toward a workpiece 16 by a turning mirror 18. The workpiece is supported on a weld fixture 20 having clamping device 22 which hold the workpiece in a desired configuration. A trailer shield 24 having a beam aperture 26 is positioned over the workpiece and is connected to a gas source 28. The weld fixture has a flow channel 30 which is beneath the workpiece and is connected to the gas source.

Figure 2:
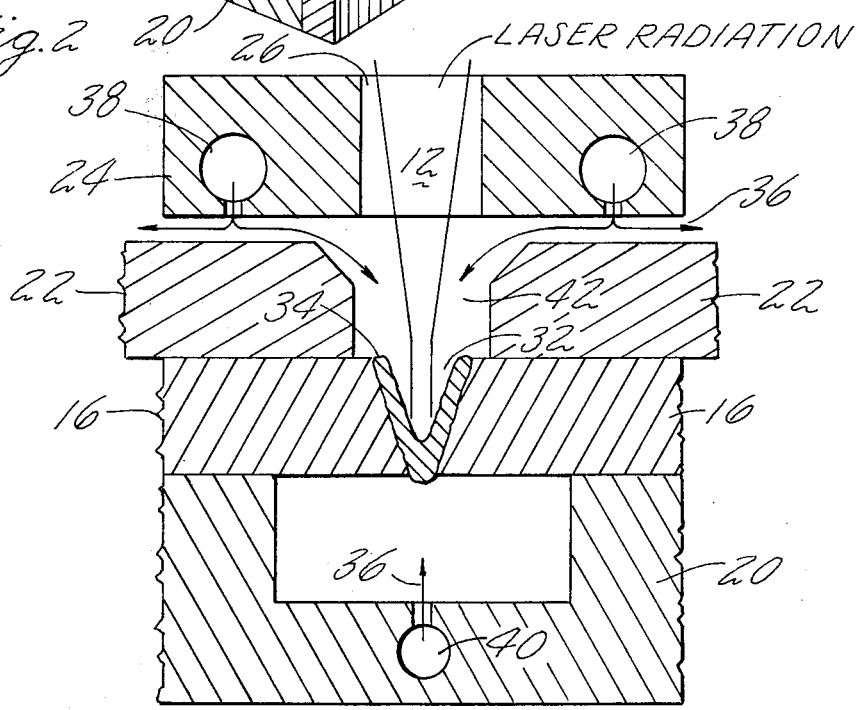
FIG. 2 is a simplified cross sectional view through the weld area of the apparatus shown in FIG. 1.

In FIG. 2 the workpiece 16 is shown in cross section with the laser beam directed into a keyhole cavity 32 which is formed within metal melt 34 in the workpiece; the output beam is focused and creates a metal vapor within this zone. A shield gas 36 provides a cover over the top and bottom of the weld. The gas is flowable from the gas source 28 both to the trailer shield through a shield manifold 38, and to the weld fixture through a fixture manifold 40 as shown in FIGS. 1 and 2.

The essence of the present invention is the literal purification of the metal in the weld zone which occurs during the laser welding process described herein. This purification is possible because the highest energy concentration in the region of the weld joint is the fusion zone per se and impurities, such as vaporized inclusions and undesirable gases are preferentially expelled from the fusion zone to regions of lower energy concentration. In practical terms, this involves movement of the gaseous contaminants from the melted metal 34 into the keyhole cavity 32 and out into the shield gas in the space between the clamping devices. At a power density of approximately 1 megawatt per square inch, the characteristic temperature of the spot of focused laser radiation is nominally 20,000° Fahrenheit. This extreme energy concentration vaporizes the surrounding metal and establishes a column of metal vapor, the keyhole, which is penetrable by the laser beam. The metal vapor exhibits sufficient pressure to offset the hydrodynamic pressure of the melted metal 34 in the fusion zone which acts to collapse the column. Movement of the focused spot maintains a dynamic equilibrium between the liquid and the vapor phases of the metal and sustains the keyhole.

Figure 3:
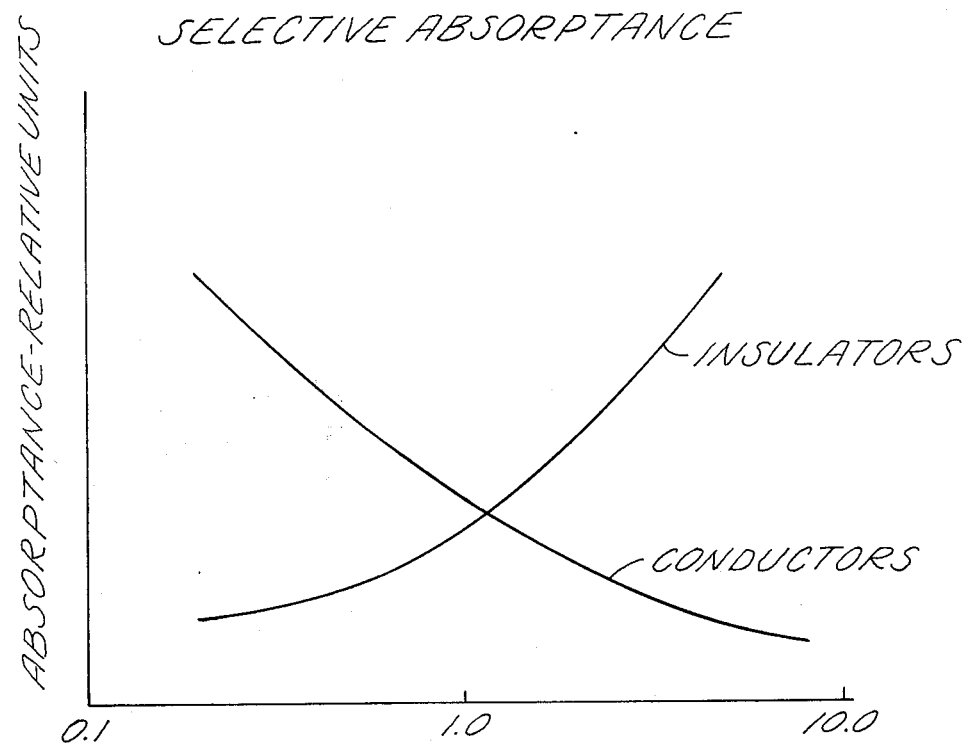
FIG. 3 is a simplified chart showing the radiant energy absorption characteristics for conductors and insulators as a function of the wavelength of the energy incident thereon.

The expulsion of the impurities purifies the metal in the fusion zone and the phenomenon is peculiar to this controlled laser welding technique because of several factors. One consideration is the negligible momentum of the incident laser beam which interacts with the workpiece to create the high energy keyhole region. The atmospheric gas and vaporized inclusions which move away from the fusion zone encounter a negligible momentum transfer in their interaction with the incident laser beam and are therefore relatively uninhibited by the energy source in their movement away from the fusion zone. In addition, the cover gas which flows into the shielding region is flowed over the weld in a direction which minimizes its velocity component normal to the surface of the workpiece thereby minimizing any turbulence and interaction between the cover gas and the molten metal in the weld which might otherwise occur; such turbulent interaction tends to discourage the escape of the vaporized inclusions from the molten metal and to encourage the pickup of cover gas and its impurities by the molten metal in the weld zone. In this regard, the laser beam passes through the cover gas without any substantial heating of the gas. If there were heating of the cover gas, a temperature gradient could be created which would tend to accelerate this gas toward the workpiece and cause gas absorption by the molten metal. As a practical matter, a contrary condition exists in which the temperature decreases in the direction away from the melt zone and the hot gaseous inclusions are thereby encouraged to move away from the region of highest energy, that is, away from the weld pool in the workpiece. An additional factor which contributes to the preferential expulsion of vaporized inclusions is the use of relatively long wavelength laser radiation as will be discussed in connection with FIG. 3. The graph shows the energy absorption characteristics as a function of the wavelength of the energy for two groups of materials, namely conductors and insulators. For laser radiation in the infrared region, the percent absorption at any given wavelength by an insulator is shown to be greater than the corresponding absorption by a conductor. Therefore, in the welding of a metal the use of laser radiation at, for example, ten microns results in a much higher absorption by nonmetallics such as the oxide and sulphide inclusions frequently found in metal welds than the absorption by the pure base metal. This disparity in absorbtivity results in a preferential heating of these oxides and sulphides which selectively raises their temperature and enhances the expulsion process.

Figure 4:
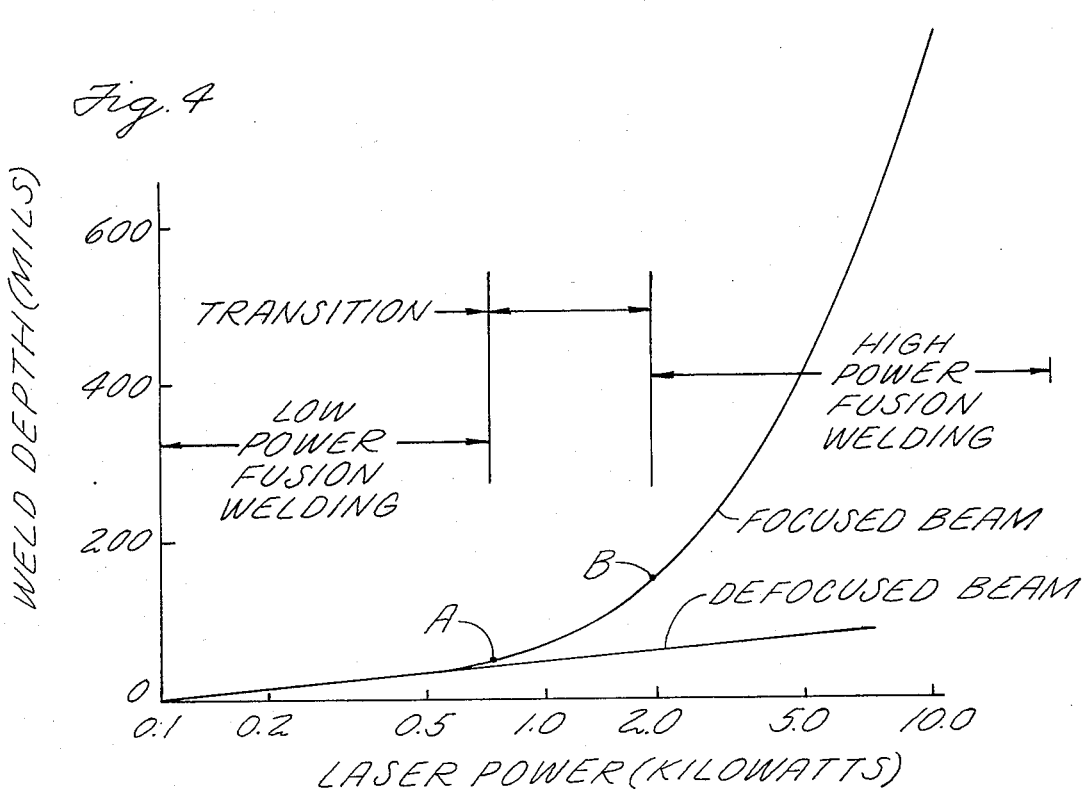
FIG. 4 is a chart showing the depth of a laser weld as a function of the laser power for both focused and defocused laser beams over the entire range from low to high power.

Another primary factor which contributes to the purification of the fusion zone by this controlled laser welding technique involves the availability of, and delicate usage of, a laser beam which meets certain criteria of power and power density as is described with reference to FIG. 4. Fusion welding with a laser beam of low power, which for the present purposes is arbitrarily defined as less than a nominal 1 kilowatt laser beam, will successfully weld metal to depths of about 100 mils. In this power range, energy is deposited at the surface and is transferred into the workpiece by heat conduction resulting in a hemispherical weld zone as is shown in FIG. 5; the same weld zone profile is obtained when welding with an electric arc. Between one and 2 kilowatts of laser powers, which is represented in FIG. 4 as the transition region, the transfer of energy from the laser beam into the workpiece is, in large part, a heat conduction dominated process, however, energy is being added to the workpiece at a rate faster than can be conducted away from the surface and some keyholing effects are experienced. In keyholing, the beam establishes a cavity in the material so that beam energy is transmitted directly into subsurface regions of the material. Weld penetrations up to approximately 200 mils are achieved in the transition power range and a typical weld zone profile produced in this manner is shown in FIG. 6; similar weld zones occur in plasma arc welding. The high power fusion welding range is considered to begin at a nominal laser power in excess of about 2 kilowatts and requires a power density in excess of approximately 1 megawatt per square inch but less than 100 megawatts per square inch. Below the lower limit the keyholing effect is not experienced and beyond the upper limit metal vaporization proceeds too fast for effective welding. As is apparent from the curve shown in FIG. 4, the greater the power level of the laser beam the greater the depth to which a laser weld can be performed. Penetrations of up to 700 and 50 mils have been observed with a high power laser beam which delivers energy so rapidly that the heat conduction process becomes secondary to the process involving keyholing and a weld zone as is shown in FIG. 7 results.

In addition to the power provided to the workpiece, a criterion which must be satisfied in order to achieve weld depths in excess of 200 mils is the power density. For example, if defocused five kilowatt laser beam having a beam spot diameter of approximately 100 mils is applied to a metal workpiece, the resulting weld zone is similar to that shown in FIG. 5. However, if the laser beam is carefully focused to provide at least the minimum power density required for fusion zone purification which is nominally a megawatt per square inch, a weld penetration of approximately 500 mils can be accomplished and the weld zone is generally of the nature shown in FIG. 7.

The controlled welding process described herein does not use a filler material. If the pieces are to be joined with a butt weld, the mating edges of the pieces are machined or fitted in some manner so that no significant gap exists. In addition, any of the standard techniques is employed to clean the weld surfaces prior to the welding process. The weld joint should be as free from surface contaminants as is practical under the circumstances in order to minimize the amount of contaminants which might remain in the fused zone after the weld has been performed. The greater the degree to which the workpiece is cleaned and prepared prior to the welding operation the lesser the porosity and contamination of the weld joint. The purification of the fusion zone which occurs as the result of the present invention is with reference to the impurities such as oxides and sulphides contained in the material itself, as distinguished from various contaminants which may be present at the surface of the workpiece. Surface contaminants such as scale, grease, and paint are normally vaporized on initial interaction with the beam. The energy gradient which is present drives these vaporized contaminants away from the weld pool and they are swept away by the shield gas.

An example of the reduction of impurities in welds performed according to the teachings contained herein is shown in Table 1. Specimens of HY-130 alloy steel were welded at twenty and thirty inches per minute and the results of a chemical analysis of the welds are provided. The table documents reductions in the nitrogen and oxygen contents in parts per million for two HY-130 alloy weld specimens.

Table 1

| Element | 20 IPM Base Metal | 20 IPM Weld Metal | 30 IPM Base Metal | 30 IPM Weld Metal |
|---|---|---|---|---|
| Carbon % | 0.127 | 0.120 | 0.122 | 0.117 |
| Nitrogen (PPM) | 125 | 103 | 130 | 115 |
| Oxygen (PPM) | 44 | 21 | 78 | 51 |
| Sulfur (PPM) | 69 | 74 | 73 | 70 |
| Hydrogen | 10 | 10 | 10 | 10 |

FIG. 8 shows the enhanced impact resistance of the weld metal as well as macrographs and scanning electron micrographs of the weld metal and base metal impact fracture surfaces. All other mechanical properties of these welds were equivalent to or superior to those of the base plate. The scanning micrographs show the difference in the amount and distribution of the impurity inclusions. In the as-fabricated base plate, the inclusions are rolled out in a flattened, stringer pattern. By contrast, in the weld, the inclusions are agglomerated into a spheroidal form which is less detrimental to mechanical properties. The fact that the volume fraction of inclusions on the fracture surface is reduced following welding is even more significant. This refinement and purification is substantially responsible for the observed enhanced impact toughness without a loss in tensile strength. Both the improved toughness and the observed decrease in the volume fraction of impurities has been reproduced in a number of other materials including merchant ship hull plate material and high strength pipeline steel.

In the operation of the apparatus shown in FIG. 1 the trailer shield and the focusing optics move as a single unit with respect to the weld fixture and the workpiece; when the workpiece is large translation of the laser beam and trailer shield with respect to the workpiece is generally preferred while if the workpiece is relatively small movement of the workpiece while the laser beam is held stationary may be more convenient. The gas source 28 provides an inert gas to the top and the bottom of the weld zone to provide a gaseous cover around the weld zone in order to prevent reaction between the hot weld metal and the atmosphere. Argon, which is readily available and relatively inexpensive, has been found to be a most suitable gas for this purpose. Argon is more dense than air and diffuses into the surrounding atmosphere relatively slowly, thereby tending to remain in the flow channel beneath the weld as well as in the region over the weld surface. The argon which tends to envelop the weld and exclude atmospheric gases, is flowed over the weld zone at a rate which is just sufficient to exclude atmospheric gases from the weld metal until its temperature is low enough to preclude reaction with the atmosphere.

In the vicinity of the beam aperture of the trailer shield, helium or an argon/helium mixture is flowed through the trailer shield over the weld region. The helium flow rate is typically less than twenty percent of total argon flow. The helium or helium/argon mixture serves two primary functions in this region, namely, the shielding function previously described with respect to the argon gas flowed through the trailer shield and a breakdown inhibiting function. For the purpose of discussing the breakdown inhibiting function, the presence of an inert gas in the vicinity of the weld will be disregarded and it will be assumed that ordinary air is present. The laser beam is focused at the surface of the workpiece to a condition of high power density and a large depth of field in order to provide as narrow and straightsided a weld penetration in the workpiece as is possible. Under these conditions, the power density of the laser beam in the metal-vapor-seeded atmosphere immediately above the weld region is sufficiently high to induce electrical breakdown and plasma formation in the air. The plasma creates a blockage in the path of the incident laser beam and a large fraction of the laser energy does not reach the workpiece due to absorption and/or reflection by the plasma thereby terminating the welding process. Since the present invention is practiced in air, a shield gas is required to prevent contamination of the molten weld puddle by the surrounding atmospheric gases, and any of a variety of inert gases are usually adequate to serve this purpose. However, in the region of the focused laser beam, many of these inert gases are as prone as air to plasma formation; argon has an even greater plasma forming tendency. Consequently, the argon flow velocity essential to the prevention of plasma formation is so high as to induce turbulent mixing with atmospheric gases as well as disruption of the molten weld pool. Addition of helium to the inert gas cover in the beam transmission region has been found effective in maintaining shielding and eliminating breakdown so that essentially all of the concentrated laser radiation does reach the workpiece; very little gas heating is experienced. Exclusive use of helium for the overall shielding application is precluded by cost considerations as well as by its potential for causing beam distortion due to its markedly different index of refraction as compared to air. The output from the inert gas source 28 is flowed around the weld zone in a direction which minimizes the velocity component normal to the surface of the weld beam and at a velocity of approximately 2 feet per second. Alternatively, a mixture of argon and up to thirty percent helium can be used to perform the plasma breakdown and aspiration functions. The factor which limits the maximum amount of argon is the velocity required to avoid breakdown. At thirty percent the mixture velocity is nominally 10 feet per second and as the amount of argon is reduced toward zero the velocity at which the gas is flowed is correspondingly reduced toward two feet per second. The described flow rates and mixtures are suitable for a laser output power level up to six kilowatts. If the power is increased substantially the flow must be increased accordingly.

The speed at which the laser beam is moved across the workpiece, the power level at which the laser operates, and the optical system used to deliver the laser beam to the laser weld area must each be carefully selected to provide a fusion zone which is as narrow as possible and conforms to a specific cross sectional profile. The keyhole in the fusion zone must be either straightsided or tapered gently in an inward direction to assume a profile such as is shown in the workpiece in FIG. 7. When the fusion zone is kept very narrow the impurities in the molten metal have a relatively short path to escape from the liquid metal into the metal vapor region within the fusion zone, and then out of the weld entirely. A weld of uniformly tapered cross section results in progressive solidification from the base to the top of the weld, a pattern which facilitates the escape of the gaseous impurities from the molten metal before solidification occurs. Alternatively, if the fusion zone assumes an hourglass cross section such as is shown in FIG. 9A or a wineglass cross section such as is shown in FIG. 9B, the gaseous impurities having a long escape pathlength through the liquid metal zone do not have sufficient time to escape from the melt before the solidification process occurs; these gaseous impurities become trapped in the weld zone, resulting in a porous and weakened weld. In addition, the entrapped volume of liquid metal formed by this configuration can also result in shrinkage porosity, because the fusion zone solidifies initially at the narrowest cross section, which is approximately midway through the workpiece. Volumes of gaseous impurities, as well as isolated liquid are trapped, the liquid resulting in shrinkage porosity in the workpiece. This behavior can be substantially more severe in a partial penetration weld. These same effects can occur if the laser beam is improperly focused and the wineglass cross section shown in 9B is produced in the weld region. Although the wineglass does not result in a bridging which traps impurities and liquid in the weld, the volume of the molten metal is sufficiently large that solidification process overtakes the rate at which the impurities progress through the melt region and so does not allow maximum elimination of vaporized impurities, before solidification takes place.

It is essential to the formation of a suitably shaped fusion zone that the laser be operated to produce a single, fundamental, output mode. As is well known, laser oscillation may take place within a cavity in any one of many transverse electromagnetic modes ($TEM_{xy}$) which are identified by the indexes $x$ and $y$.

For example, if $x$ and $y$ are both zero in an optical cavity formed by a plane and a concave mirror, the output beam is characterized by a Gaussian energy profile which permits focusing to the smallest possible spot diameter for the given laser wavelength or, conversely, to a given spot diameter with maximum depth of field. As the indexes increase in value the beam focusability decreases; for example, for $x$ equal to zero and $y$ equal to one, the beam focuses to two separated spots and the beam tends to produce an unacceptable condition of two separate weld zones. Restriction of laser operation to a fundamental mode in keeping with the requirements of the zone purification process therefore implies selection of the indexes $x$ and $y$ in accordance with known electromagnetic theory such that a single, well defined spot is obtained at the beam focus. For example, the modes $TEM_{00}$, $TEM_{01}^*$, $TEM_{10}$ and $TEM_{11}^*$ of a cavity formed by a concave/plane mirror combination are satisfactory.

In addition to maintaining fundamental mode operation, multimode operation which is characterized by a time varying output mode must necessarily be avoided. Such behavior is to be avoided since each mode is characterized by a slightly different divergence, the sharpest focus occurs at different points for a given focusing system. Thus, operation in more than one mode tends to blur the focused spot and thereby degrade performance. In addition, the output beam is processed with focusing optics which are designed to ensure the longest depth of field possible while maintaining the power density at or above a megawatt per square inch. Transmissive or reflective optics exhibiting near diffraction limited focusability characteristics may be utilized for this purpose. Typically, a spot having a depth of field of approximately one eighth inch and a spot diameter of about 30-mils has been found to promote effective welding.

Another consideration is maintaining the surface welding speed at a rate sufficient to prevent excess melting in the weld zone. The keyhole cavity established by the lasser beam cannot be maintained stationary for an extended period of time. If the beam is left fixed with respect to the workpiece, more material is melted around the cavity than is required to cause fusion between the pieces to be joined and very quickly the excess molten metal upsets the vapor/liquid metal equilibrium in the keyhole and the cavity collapses. Therefore, relative motion between the beam and the workpiece must be sufficiently high to dynamically stabilize the keyhole cavity. Specifically the beam residence time at any loaction must be small relative to the thermal conduction time for the base material. In metals, a beam translation speed of approximately 20 inches per minute has been determined to be sufficient to satisfy the equilibrium conditions for all conditions of laser power.

Various combinations of weld depth, laser power and welding speed can be achieved while practicing the present invention. For example, with a laser system which produces an output beam containing 6 kilowatts of power, a surface welding speed of one hundred inches per minute is maintainable in a workpiece of ordinary steel, one eighth of an inch thick. Alternatively, in a workpiece one half inch thick, a surface welding speed of twenty five inches per minute can be achieved while maintaining a weld zone such as the one represented in FIG. 7. The laser optics, diameter of the focused beam, depth of field, and gas flow rates typically required are as disclosed above. In the examples provided, the welding speed and laser power are essentially material independent and suitable welds occur in titanium, stainless steel, mild steel and aluminum as well as other materials.

An additional means of preventing the entrapment of gas and the formation of isolated pockets of liquid during solidification is to provide a heat sink on the underside of the piece being welded. This encourages solidification to occur progressively from the bottom of the penetration cavity toward the top, thereby preventing bridging of solid over liquid and gas during solidification. Providing a heavy section weld fixture 20, of a material with high thermal conductivity is required, and for continuous usage, as in a production setup, such a fixture should be cooled, in order to keep its temperature low, relative to the plate being welded and to establish a thermal gradient through the workpiece which will promote progessive solidification from bottom to top.

Laser welding has been generically critized because of the low efficiency with which the electrical energy is utilized. Much of this criticism is justifiable because of the very low efficiency with which the electrical energy is converted into laser energy, particularly in the case of some solid state laser systems which can be considerably below 1 percent. Also, the energy is transferred to the workpiece ineffectively in conventional laser welding. Using an arc welder as the standard of comparison, approximately fifty percent of the electrical energy applied to the equipment appears in the melt zone; the remaining 50 percent is lost by radiant heat transfer, conductive heat transfer and electrical losses in the system. With the present invention, employing a carbon dioxide laser system, about 15 percent of the electrical energy supplied appears as laser energy and most of this is absorbed in the workpiece so that 10 percent of the input electrical energy appears in the melt zone. However, because of the different nature of the fusion zone which is produced when welding in accordance with the present invention, a given linear distance of laser weld actually requires approximately one tenth the amount of energy which is required to produce the same weld with an arc welding technique. A significantly lesser amount of base material is melted performing a laser weld than is melted in performing an arc weld. Thus, the electrical energy required per unit length of laser weld is actually less than the required for an arc weld in the same material.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. The method of providing a purified fusion zone through the controlled welding of a metal having an impurity content including in combination the steps of:

shaping the metal to eliminate any significant gap between the pieces to be joined to avoid a reduction in the section thickness at the weld joint;

cleaning the surfaces of the metal to be joined in the immediate vicinity of the weld zone to remove surface contamination prior to the fusion of the metal in this zone;

juxtaposing the metal in the immediate vicinity of the weld zone to describe a weld joint;

clamping the metal to be joined to assure good alignment and to eliminate relative motion at the weld joint during welding;

providing a stable beam of laser radiation in a fundamental, transverse electric mode containing at least two kilowatts of power to initiate melting at the surface of the metal;

focusing the laser beam to a spot having a power density of at least one but less than one hundred megawatts per square inch to produce a keyhole cavity in the melted metal in which a column of vaporized metal is formed adjacent to the molten metal and vaporized impurities escape from the melted metal before solidification;

maintaining a layer of shield gas adjacent to the weld to avoid chemical reaction between the heated metal and the atmosphere; and aspirating the weld to remove impurities from the melted metal by establishing a flowing inert gas environment above the melted metal which excludes atmospheric gases from the melted metal and simultaneously prevents plasma formation in the region of the focus laser beam.

2. The invention according to claim 1 including the additional step of introducing a relative motion between the metal and the focused spot sufficient to maintain a dynamic equilibrium between the vaporized base metal in the keyhole and the enclosed molten metal and to prevent collapse of the keyhole cavity, thereby allowing vaporized impurities to escape from the melt prior to solidification of the molten metal.

3. The invention according to claim 2 including the additional step of providing a heat sink at the base of the weld to promote progressive solidification of the metal in the weld zone from the point of deepest penetration in the metal to the surface at which metal melting is initiated.

4. The invention according to claim 2 including the additional step of focusing the laser beam to a spot having the maximum depth of field.

5. The method of providing a purified fusion zone through the controlled welding of a metal having an impurity content including in combination the steps of:

shaping the metal to eliminate any significant gap between the pieces to be joined to avoid a reduction in cross section thickness at the weld joint;

cleaning the surfaces of the metal to be joined in the immediate vicinity of the weld zone to remove surface contamination prior to the fusion of the metal in this zone;

juxtaposing the metal in the immediate vicinity of the weld zone to describe a weld joint;

clamping the metal to be joined to assure good alignment and to eliminate relative motion of the weld joint during welding;

providing a stable beam of radiation from a carbon dioxide laser in a fundamental transverse electromagnetic mode containing at least two kilowatts of power to initiate melting at the surface of the metal;

focusing the beam to a spot having a power density of at least one but less than one hundred megawatts per square inch to produce a keyhole cavity in the base metal in which a column of vaporized metal is formed adjacent to the molten metal and vaporized impurities from the molten metal escape from the melt before solidification;

providing a heat sink at the base of the weld to promote progressive solidification of the metal in the weld zone from the point of deepest penetration in the metal to the surface at which metal melting is initiated;

introducing a relative motion of at least 20 inches per minute between the metal and the focused spot to maintain a dynamic equilibrium between the vaporized metal in the keyhole and the adjacent molten metal and to prevent collapse of the keyhole cavity thereby allowing vaporized impurities to escape from the melt prior to solidification;

maintaining a layer of argon gas adjacent to the weld to avoid chemical reaction between the heated metal and the atmosphere; and aspirating the weld to remove impurities from the melted metal by establishing a flowing inert gas environment above the melted metal which excludes atmospheric gases from the melted metal and simultaneously prevents plasma formation in the region of the focus laser beam.

6. The invention according to claim 5 including the additional step of adjusting the radiation from the carbon dioxide laser to assure that the radiation striking the surface of the metal contains no more than one transverse electromagnetic mode.

7. The method of providing a purified fusion zone through the controlled welding of a metal having an impurity content including in combination the steps of:

shaping the metal to eliminate any significant gap between the pieces to be joined to avoid a reduction in the section thickness at the weld joint;

cleaning the surfaces of the metal to be joined in the immediate vicinity of the weld zone to remove surface contamination prior to the fusion of the metal in this zone;

juxtaposing the metal in the immediate vicinity of the weld zone to describe a weld joint;

clamping the metal to be joined to assure good alignment and to eliminate relative motion at the weld joint during welding;

providing a stable beam of laser radiation in a fundamental, transverse electric mode containing at least 2 kilowatts of power to initiate melting at the surface of the metal;

focusing the laser beam to a spot having a power density of at least 1 but less than 100 megawatts per square inch to produce a keyhole cavity in the melted metal in which a column to vaporized metal is formed adjacent to the molten metal and vaporized impurities escape from the melted metal before solidification;

maintaining a layer of shield gas adjacent to the weld to avoid chemical reaction between the heated metal and the atmosphere; and isolating the melted metal from atmospheric gases with an environment of inert gas which is flowed above the melted metal.

8. The method of providing a purified fusion zone through the controlled welding of a metal having an impurity content including in combination the steps of;

shaping the metal to eliminate any significant gap between the pieces to be joined to avoid a reduction in the section thickness at the weld joint;

cleaning the surfaces of the metal to be joined in the immediate vicinity of the weld zone to remove surface contamination prior to the fusion of the metal in this zone;

juxtaposing, the metal in the immediate vicinity of the weld zone to describe a weld joint;

clamping the metal to be joined to assure good alignment and to eliminate relative motion at the weld joint during welding;

providing a stable beam of laser radiation in a fundamental, transverse electric mode containing at least 2 kilowatts of power to initiate melting at the surface of the metal;

focusing the laser beam to a spot having a power density of at least one but less than 100 megawatts per square inch to produce a keyhole cavity in the melted metal in which a column of vaporized metal is formed adjacent to the molten metal and vaporized impurities escape from the melted metal before solidification.

maintaining a layer of shield gas adjacent to the weld to avoid chemical reaction between the heated metal and the atmosphere; and establishing a flow of inert gas adjacent to the melted metal in order to aspirate the weld and remove impurities from the melted metal while excluding atmospheric gases from the melted metal, and to prevent plasma formation in the region immediately adjacent to the metal.

* * * * *

UNITED STATES PATENT OFFICE
CERTIFICATE OF CORRECTION

PATENT NO. : 4,000,392
DATED : December 28, 1976
INVENTOR(S) : CONRAD M. BANAS ET AL It is certified that error appears in the above-identified patent and that said Letters Patent are hereby corrected as shown below:

| | | |
|---|---|---|
| Column 1, | line 19 | "inpurities" should read -- impurities -- |
| | line 21 | "filter" should read -- filler -- |
| | line 66 | "move" should read -- more -- |
| Column 2, | line 10 | "of" should read -- or -- |
| | line 35 | "breadkdown" should read -- breakdown -- |
| Column 3, | line 66 | "device" should read -- devices -- |
| Column 5, | line 65 | after the word "if" insert -- a -- |
| Column 10, | line 48 | "the" should read -- that -- |
| Column 12, | line 51 | "to" should read -- of -- |

Signed and Sealed this

Third Day of May 1977

[SEAL]

Attest:

RUTH C. MASON
Attesting Officer

C. MARSHALL DANN
Commissioner of Patents and Trademarks